L. FOOTE.
ELECTRIC MOTOR.
APPLICATION FILED NOV. 4, 1918.
1,338,568. Patented Apr. 27, 1920.
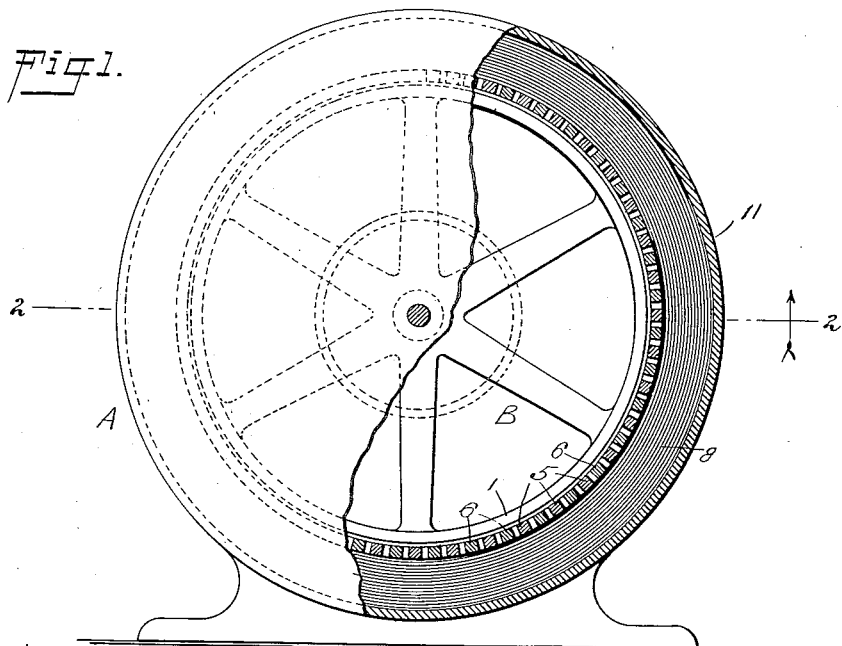
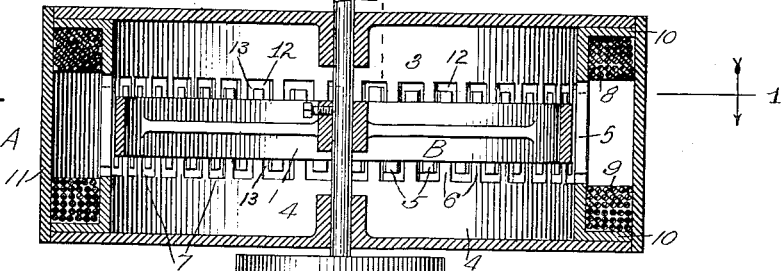
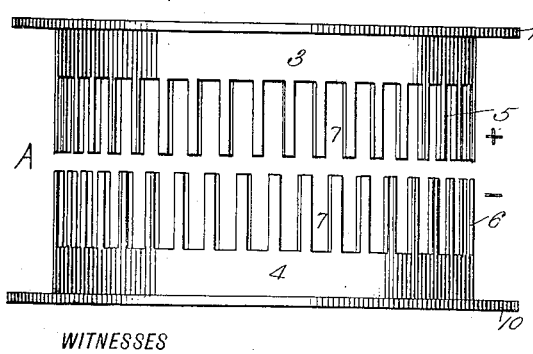
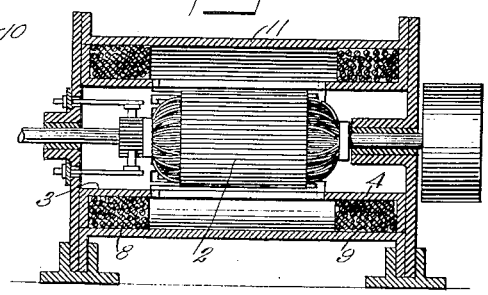
WITNESSES
William P. Goebel
C. Bradway
INVENTOR
L. Foote
BY Mundey
ATTORNEYS ized.

UNITED STATES PATENT OFFICE.

LEONARD FOOTE, OF PEDRO MIGUEL, CANAL ZONE, PANAMA.

ELECTRIC MOTOR.

1,338,568.   Specification of Letters Patent.   Patented Apr. 27, 1920.

Application filed November 4, 1918. Serial No. 261,066.

*To all whom it may concern:*

Be it known that I, LEONARD FOOTE, a citizen of the United States, and a resident of Pedro Miguel, Canal Zone, Panama, have invented a new and Improved Electric Motor, of which the following is a full, clear, and exact description.

This invention relates to an electric motor and has to deal more particularly with a field element.

The invention has for its general objects to improve the construction of a field structure which is comparatively simple and inexpensive to manufacture and so designed that a large number of poles are provided within a small space, whereby a low speed motor can be produced, the field structure being applicable to both alternating and direct current motors.

A more specific object of the invention is the provision of a field structure in which two rings or cylinders of the same diameter are arranged on a common axis, there being spaced teeth on the meeting edges of the rings, all the teeth of one ring being of one polarity and those of the other of opposite polarity, and the rings are so arranged that the pole teeth of one ring extend into the interpolar spaces of the other ring, whereby a plurality of closely arranged alternate poles are produced.

With such and other objects in view, the invention comprises various novel features of construction and arrangement of parts which will be set forth with particularity in the following description and claim appended hereto.

In the accompanying drawing, which illustrates certain embodiments of the invention and wherein similar characters of reference indicate corresponding parts in all the views, Figure 1 is a side view of an induction motor with portions broken away to show the field element, the section being taken on the line 1—1, Fig. 2;

Fig. 2 is a section on the line 2—2, Fig. 1;

Fig. 3 is a side view of the two pole-carrying rings of the field structure; and Fig. 4 is a sectional view of a direct current motor.

Referring to the drawing, A designates the stator of the motor and B the rotor, which latter may be of any desired type, such as a ring 1 of metal, as in Figs. 1 and 2, or a squirrel-cage armature or a commutating armature 2, as in the direct current machine, Fig. 4. The present invention resides in the field structure, so that the rotor or armature need not be considered in detail.

The field structure A comprises a pair of rings 3 and 4 arranged on a common axis and of the same diameter, and the meeting edges are provided with teeth 5 and 6 which are closely arranged and are separated by spaces wider than the width of the teeth, so that the teeth of one ring can enter the spaces 7 of the other ring. The teeth form poles of the same sign. For instance, the poles 5 are positive and the poles 6 are negative, or vice versa. When the rings are fitted together, as in Figs. 1 and 2, there will be comparatively narrow closely arranged poles which alternate in polarity in the direction of rotation of the armature or rotor. The rings together form a spool on which is a winding which may be arranged in sections 8 and 9 located between the roots of the teeth or poles 5 and 6 and the flanges 10. Surrounding the rings 3 and 4 is a cylinder 11 which coöperates with the rings to form a complete circuit for the magnetic flux, it being understood that the turns of the windings are in the same direction, so that the flux generated by the two sections of the winding form a common flux passing through the ring 3, pole 5, a portion of the periphery of the rotor B, pole 6, ring 4 and casing 11. Various magnetic poles thus formed act inductively on the rotor in the usual manner to cause the latter to rotate by the magnetic interaction and reactions.

From the foregoing description taken in connection with the accompanying drawing, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claim.

The teeth are so spaced that the circumferential distance 13, between the teeth 5 and 6, is shorter than the distance 12, but said distance 13 is greater than that between the periphery of the rotor and the teeth so that the magnetic flux will more readily pass from one tooth to another by way of the soft iron core of the rotor than through the air gap 13 directly between the teeth. Thus by using a rotor with a wire wound soft iron core, the magnetic flux passing between the teeth and the rotor will be cut by the winding on the rotating rotor thereby generating a current in the rotor winding.

Having thus described my invention, I claim as new and desire to secure by Letters Patent:

The combination with a rotor, of a pair of cylinders of like diameter and axes, each formed with polar teeth arranged with the teeth of one cylinder entering between the teeth of the other so that the reluctance between the teeth is greater than the reluctance between the teeth and the periphery of the stator, said cylinders having flanges, a third cylinder arranged concentrically with the first mentioned cylinders, and engaging the flanges, thereby completing a circuit for the magnetic flux, and a winding between the third cylinder and the toothed cylinders, whereby all the teeth of one cylinder will be of one polarity while the teeth of the other cylinder will be of opposite polarity.

LEONARD FOOTE.